United States Patent [19]
Luzzi

[11] Patent Number: 5,881,499
[45] Date of Patent: Mar. 16, 1999

[54] ANCHOR FOR HURRICANE-RESISTING BUILDING ROOF STRUCTURE TIE-DOWN

[75] Inventor: Joseph F. Luzzi, Avon, Conn.

[73] Assignee: Tempete LLC, Manchester, Conn.

[21] Appl. No.: 40,034

[22] Filed: Mar. 17, 1998

[51] Int. Cl.[6] .................................................. E04B 7/00
[52] U.S. Cl. .......................... 52/23; 52/DIG. 12; 52/698; 403/353
[58] Field of Search ....................... 52/23, 698, DIG. 12; 403/353

[56] References Cited

U.S. PATENT DOCUMENTS

| | | | |
|---|---|---|---|
| 1,491,571 | 4/1924 | Tomkinson et al. | 403/353 X |
| 3,845,597 | 11/1974 | Foster | 52/23 X |
| 3,871,142 | 3/1975 | Abbott | 52/23 |
| 4,110,940 | 9/1978 | Vanderlyn | 52/23 |
| 4,473,316 | 9/1984 | Welch | 403/353 X |
| 4,630,982 | 12/1986 | Fenner | 403/353 X |
| 5,537,786 | 7/1996 | Lozier et al. | 52/23 |
| 5,603,186 | 2/1997 | Zaffino | 52/23 |
| 5,687,512 | 11/1997 | Spoozak et al. | 52/23 |
| 5,716,154 | 2/1998 | Miller et al. | 403/353 X |

*Primary Examiner*—Lanna Mai
*Assistant Examiner*—Timothy B. Kang
*Attorney, Agent, or Firm*—M. P. Williams

[57] ABSTRACT

An anchor 14 for a building roof structure tie-down strap 12 comprises a rectangular hollow steel box 27 having a keyhole 26 formed at one end of one surface, which slips over the head 24 of an anchor pin 17 permanently fixed in the foundation 19 of a building, and a pair of bolt holes 29 formed at an opposite end in a pair of adjacent surfaces to receive a bolt 30 for fastening a strap-tightening ratchet 13 to the box 27.

2 Claims, 2 Drawing Sheets

ANCHOR FOR HURRICANE-RESISTING BUILDING ROOF STRUCTURE TIE-DOWN

TECHNICAL FIELD

This invention relates to a simplified anchor to interconnect the ratchet of a building roof structure tie-down strap with the foundation of the building.

BACKGROUND ART

In U.S. Pat. No. 5,537,786, straps utilized to clamp the roof structure of a building to the sidewall structure thereof are secured to the foundation of the building by means of ratchets which in turn are fastened to eye-bolts secured in the foundation by connectors. The use of eye-bolts and connectors which form a transition between the eye-bolts and strap ratchets comprise a weak, complicated and expensive portion of an overall tie-down system.

DISCLOSURE OF INVENTION

Objects of the invention include providing an improved transition between the ratchet of a building roof tie-down system and the foundation, to which it is attached.

According to the present invention, an anchor for a building roof tie-down system comprises a square, hollow metal box having a pair of holes to receive a bolt for fastening the strap-tightening ratchet to the anchor in a first plane, and a keyhole to receive the head of an anchor pin or bolt secured in the foundation, said keyhole passing through said box in a plane perpendicular to the first plane. According to the invention, bolts or pins are permanently installed into the foundation of a building, such as by epoxy resin or other suitable agent, and the tie-down straps are deployed to the building by hooking the keyhole slot of the box over the anchor pin, which may comprise a threaded bolt with a hexagonal head, or a similar pin having no threads and a round, disk-shaped head.

The invention provides a simple way of connecting the strap system to the foundation, and further provides a surface (the flat side of the box) to distribute torque loads to the foundation.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
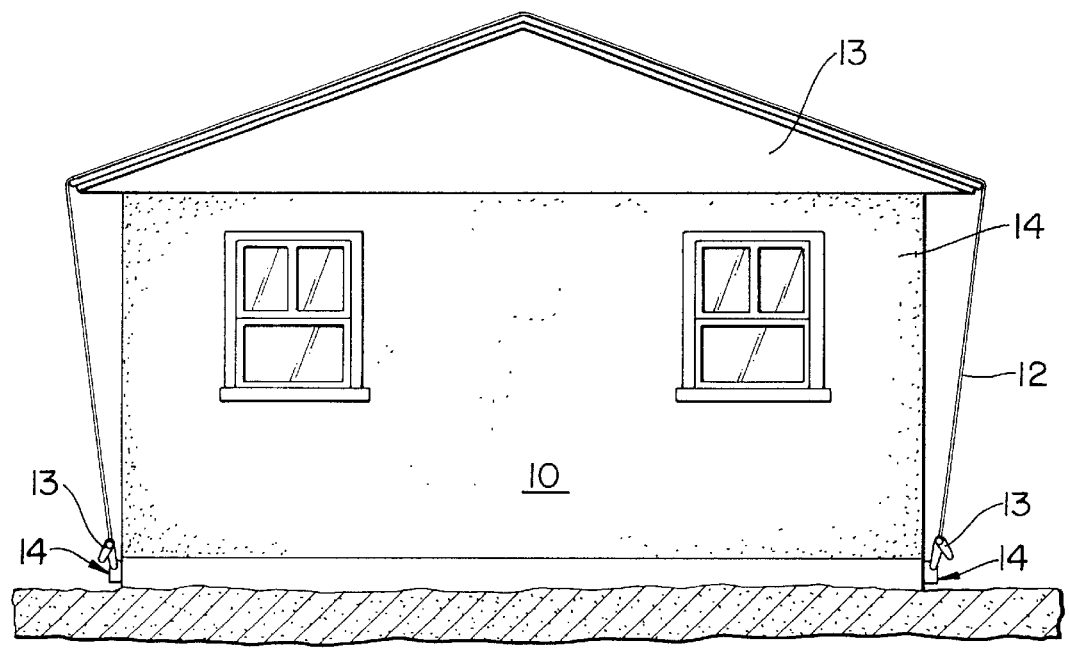
FIG. 1 is an end elevation view of a building having a roof structure tie-down system employing anchors of the present invention.
Figure 2:
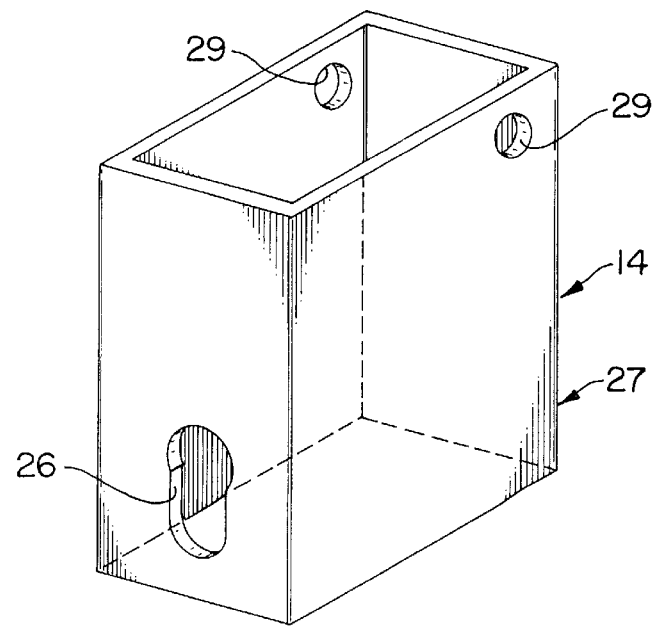
FIG. 2 is a perspective view of the box portion of an anchor according to the present invention.
Figure 3:
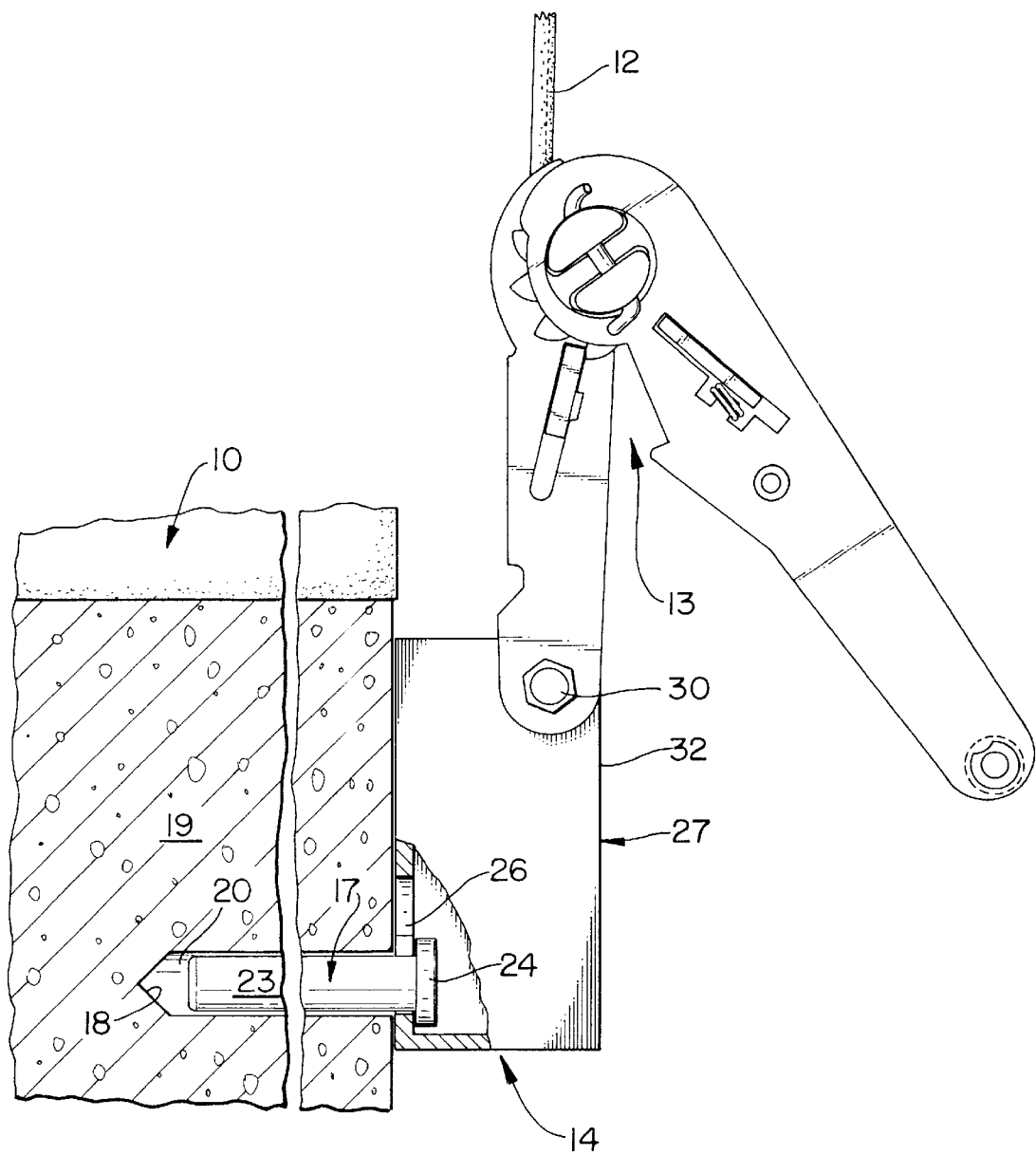
FIG. 3 is a partially sectioned, side elevation view of a building roof tie-down system, including a ratchet and an anchor according to the present invention.

Referring to FIG. 1, a building 10 has a strap 12 extending over the roof thereof, there typically being six or more straps to a building to tie the roof structure 13 of the building to the wall structure 14 thereof. Each end of the strap 12 is received by a ratchet 13 which is bolted to an anchor 14. As seen in FIG. 3, the anchor 14 comprises an anchor pin 17 which is permanently fastened in a hole 18 of the foundation 19 of the building 10 by means of epoxy resin 20, or other suitable means. The anchor pin 17 has a shank portion 23 and a head portion 24. The shank may be threaded and the head may be hexagonal, such that the anchor pin 17 may comprise a bolt. Preferably, however, the anchor pin 17 will have an unthreaded shank and a round head 24. The head 24 of the anchor pin 17 passes through a keyhole slot 26 of a box 27 (FIG. 2) which is comprised of rectangular metal tubing, such as steel tubing, having a pair of holes 29 to receive a bolt 30 (FIG. 3) that secures the ratchet 13 to the box 27. The holes 29 preferably are near the top of the box 27 so that the box does not interfere with the ratchet 13, and are preferably closer to the outer wall 32 (FIG. 3) of the box 27 so as to space the ratchet 13 away from the foundation 19. The holes 29 and the keyhole 26 are preferably adjacent opposite ends of the box 27 so as to transfer to the foundation 19, the torque (counterclockwise as seen in FIG. 3) which results from the bolt 30 being outward from the head 24 of the anchor pin 17, through the foundation 19.

The aforementioned patent application is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A building system, comprising:

a building having a foundation including a pair of holes on opposite sides of the building, said building having a roof structure and a vertical wall structure supporting said roof structure on said foundation;

a flexible tie-down strap extending over a transverse plane of said roof structure in the vicinity of said holes;

a pair of anchor pins, each of said anchor pins having an enlarged head, each of said pins being permanently fixed to said foundation within said holes with the enlarged head thereof extending outwardly from said foundation;

a pair of bolts;

a pair of hollow steel boxes, each having near one end a keyhole slot, wherein the head of a corresponding one of said anchor pins is engaged in said keyhole slot, each of said boxes having a pair of holes receiving a corresponding one of said bolts therein; and a pair of tensioning devices, one for each end of said tie-down strap, each connected to a corresponding one of said boxes by means of the corresponding one of said bolts through the pair of holes of said box, each said tensioning device engaging one end of said tie-down strap and operable to draw said strap toward said tensioning device, to thereby firmly tie said roof structure to said wall structure.

2. A building system, comprising:

a building having a foundation including a pair of holes on opposite sides of the building, said building having a roof structure and a vertical wall structure supporting said roof structure on said foundation;

a flexible tie-down strap extending over a transverse plane of said roof structure in the vicinity of said holes;

a pair of anchor pins, each of said anchor pins having an enlarged head, each of said pins being disposed in said foundation within said holes with the enlarged head thereof extending outwardly from said foundation;

a pair of bolts;

a pair of hollow steel boxes, each having near one end a keyhole slot, wherein the head of a corresponding one of said anchor pins is engaged in said keyhole slot, each of said boxes having a pair of holes receiving a corresponding one of said bolts therein; and a pair of tensioning devices, one for each end of said tie-down strap, each connected to a corresponding one of said boxes by means of the corresponding one of said bolts through the pair of holes of said box, each said tensioning device engaging one end of said tie-down strap and operable to draw said strap toward said tensioning device, to thereby firmly tie said roof structure to said wall structure.

* * * * *